United States Patent
Ai

(10) Patent No.: US 8,755,334 B2
(45) Date of Patent: Jun. 17, 2014

(54) METHOD AND NETWORK-SIDE DEVICE FOR OPTIMIZING ACTIVATION/DEACTIVATION OF ISR

(75) Inventor: Ming Ai, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 13/634,598

(22) PCT Filed: Jun. 10, 2011

(86) PCT No.: PCT/CN2011/075576
§ 371 (c)(1),
(2), (4) Date: May 15, 2013

(87) PCT Pub. No.: WO2011/157202
PCT Pub. Date: Dec. 22, 2011

(65) Prior Publication Data
US 2013/0223312 A1 Aug. 29, 2013

(30) Foreign Application Priority Data

Jun. 18, 2010 (CN) .............................. 201010209863

(51) Int. Cl.
*H04W 4/00* (2009.01)
*H04W 80/04* (2009.01)
*H04L 12/70* (2013.01)

(52) U.S. Cl.
CPC ....... *H04W 80/04* (2013.01); *H04L 2012/5608* (2013.01)
USPC .......................................... 370/328; 370/349

(58) Field of Classification Search
CPC ................. H04W 80/04; H04W 84/12; H04L 2012/5608
USPC ................................ 370/310.2, 328, 338, 349
See application file for complete search history.

(56) References Cited

U.S. PATENT DOCUMENTS

| | | | |
|---|---|---|---|
| 2005/0105545 A1 | 5/2005 | Thousand et al. | |
| 2010/0120427 A1* | 5/2010 | Guo | 455/435.1 |
| 2011/0116449 A1* | 5/2011 | Hu et al. | 370/328 |

FOREIGN PATENT DOCUMENTS

| | | |
|---|---|---|
| CN | 101500223 A | 8/2009 |
| CN | 101646158 A | 2/2010 |
| CN | 102083047 A | 6/2011 |
| EP | 002139190 A1 | 12/2009 |
| EP | 002293630 A1 | 3/2011 |
| WO | 2011157202 A1 | 12/2011 |

* cited by examiner

*Primary Examiner* — Brenda H Pham
(74) *Attorney, Agent, or Firm* — Kilpatrick Townsend & Stockton LLP

(57) ABSTRACT

The present application relates to mobile communication technical field, and a method for optimizing activation/deactivation Idle State signaling Reduction (ISR) and a network side device are disclosed. The method includes: during a process of updating User Element (UE) area, a first network entity, when receiving a context request message transmitted from a second entity, determines to activate or deactivate ISR, according to a mobile-reachable timer or an implicit detach timer corresponding to said UE, or operation states of the mobile-reachable timer and the implicit detach timer; and the first network entity transmits the determination result to the second network entity, said second network entity determines to instruct the UE to activate or deactivate the ISR according to the received determination result. The application optimizes the existing procedure for the activating/deactivating of the ISR, enables the ISR processing at the network side and the UE side to be consistent in height, and thus avoiding unnecessary signaling expense.

16 Claims, 7 Drawing Sheets

METHOD AND NETWORK-SIDE DEVICE FOR OPTIMIZING ACTIVATION/DEACTIVATION OF ISR

The present application is a US National Stage of International Application No. PCT/CN2011/075576, filed 10 Jun. 2011, designating the United States, and claiming claims priority to Chinese Patent Application No. 201010209863.1, filed with the State Intellectual Property Office of China on Jun. 18, 2010 and entitled "Method and network-side device for optimizing activation/deactivation of ISR", which is hereby incorporated by reference in its entirety.

FIELD OF THE INVENTION

The present invention relates to the field of mobile communications and particularly to a method and network-side device for optimizing activation/deactivation of ISR, an ISR operation method at the User Equipment (UE) side and a LIE.

BACKGROUND OF THE INVENTION

Idle State Signalling Reduction (ISR) is a technology to reduce idle state signalling in an Evolved Packet System (EPS) so as to alleviate a signalling load between a User Equipment (UE) in an idle state and a network.

A Serving GPRS Support Node (SGSN, where GPRS stands for General Packet Radio Service) is a network entity in a Universal Terrestrial Radio Access Network (UTRAN), and a Mobility Management Entity (MME) is a network entity in an Evolved Universal Terrestrial Radio Access Network (E-UTRAN).

When the UE registers with both the MME in the E-UTRAN and the SGSN in the UTRAN and activates ISR, the UE in an idle state will not perform signalling interaction with the network side while the UE resides and moves in a Tracking Area (TA) in a list of Tracking Area IDs (TAIs) registered in the E-UTRAN and a Routing Area (RA) registered in the UTRAN.

Activation of ISR is controlled at the network side, and when the UE in an idle state initiates a Tracking Area Update (TAU) or Routing Area Update (RAU) procedure in the E-UTRAN or the UTRAN, the MME or the SGSN instructs the UE to activate or deactivate ISR in a TAU Accept message or an RAU Accept message, and the UE activates or deactivates ISR in response to the instruction. An initial value of a Temporary Identity used in Next update (TIN) is set by the UE upon successful attachment. The UE resets the TIN to a Globally Unique Temporary Identity (GUTI) regardless of original value thereof upon successful initial attachment to the E-UTRAN. The UE resets the TIN to a Packet Temporary Mobile Station Identity (P-TMSI) regardless of original value thereof upon successful initial attachment to the GERAN/UTRAN. The UE has to set a locally stored TIN to a GUTI or a P-TMSI regardless of original value thereof upon reception of the TAU Accept message or the RAU Accept message instructing ISR to be deactivated. With the TAU Accept message instructing ISR to be activated, the UE decides setting of the TIN dependent upon the value of the TIN. If the value of the TIN is a P-TMSI or a Radio Access Type related TMSI (RAT-related TMSI), the TIN is set to the RAT-related TMSI, and if the value of the TIN is a GUTI, the value of the TIN is set to the GUTI. With the RAU Accept message instructing ISR to be activated, the UE decides setting of the TIN dependent upon the value of the TIN if the value of the TIN is a GUTI or an RAT-related TMSI, the TIN is set to the RAT-related TMSI, and if the value of the TIN is a P-TMSI, the value of the TIN is set to the P-TMSI. Noted the value of the TIN is merely for the purpose of distinguishing.

In this context, "area update" broadly refers to "tracking area update" or "routing area update". The following description will be given by way of an example in which a UE firstly is attached to a network over a UTRAN and then accesses an E-UTRAN to initiate a TAU procedure. As illustrated in FIG. 1, the TAU procedure is as follows.

The UE determines that a TAU trigger condition is satisfied when the UE accesses a TA in the E-UTRAN from an RA in the UTRAN and the triggers a TAU to be started (the step S101); the UE initiates a Tracking Area Update Request to an MME (the step S102 to the step S103); since the UE is registered with an old S4 SGSN (one type of SGSN supporting ISR; and SGSN in this context generally refers to the S4-SGSN), the new MME retrieves context information of the UE from the old SGSN (the step S104, the step S105 and the step 107); then the MME instructs a Serving Gateway (GW)/a Packet Data Network Gateway (PDN GW) to modify bearer information of the UE (the step S109 to the step S113); the MME transmits a Location Update Request to an HSS to instruct the HSS to cancel location information of the UE in the old SGSN (the step S114 to the step S116); the old SGSN releases an Iu interface connection (the step S117 and the step S118); the HSS returns a Location Update Response message to the MME (the step S119); and the MME returns a Tracking Area Update Accept Message to the UE to thereby finish the tracking area update (the step S120 to the step S121). The MME may re-authenticate the UE in the TAU procedure (the step S106).

ISR-related aspects in the foregoing TAU procedure are stipulated in the existing specification (TS23.060 and TS23.401) as follows:

In the step S105, the SGSN transmits a Context Response message to the MME to instruct ISR to be activated; and In the step S107, the SGSN receives a Context Acknowledgement message, transmitted from the MME, instructing ISR to be activated, and then the SGSN has to maintain a context of the UE.

The foregoing stipulations may result in a problem which will be described below in connection with several related timers.

A mobile reachable timer of the UE is maintained at the network side, the mobile reachable timer is started when the UE enters an idle state, and the mobile reachable timer is stopped at the network side when the UE has a Non-Access Stratum (NAS) signalling connection established with the network side (the UE enters a connected state); and An implicit detach tinier of the UE is maintained at the network side, and if the mobile reachable timer expires and the UE has no NAS signalling connection established with the network side, the implicit detach timer is started at the network side. An implicit detach procedure is initiated at the network side after the implicit detach timer expires. The implicit detach timer is stopped at the network side when the UE has an NAS signalling connection established with the network side.

The UE maintains a periodic TAU timer, or a periodic RAU timer, or a periodic TAU timer and a periodic RAU timer dependent upon an access scheme and an ISR state.

The UE with a UTRAN access has to maintain a periodic RAU timer when ISR is deactivated. The UE has to initiate a periodic RAU procedure when the periodic RAU timer expires. The UE with an E-UTRAN access has to maintain a periodic TAU timer when ISR is deactivated. The UE has to initiate a periodic TAU procedure when the periodic TAU timer expires. The periodic TAU timer, or the periodic RAU timer, or the periodic TAU timer and the periodic RAU timer are started when the UE enters an idle state and stopped when the UE has an NAS signalling connection established with the network.

The UE has to maintain both of the timers when ISR is activated. If the periodic TAU timer expires when the UE resides in the UTRAN, the UE has to start an E-UTRAN Deactivate ISR Timer, and the UE has to initiate a TAU procedure immediately upon next entry into the E-UTRAN. When the E-UTRAN Deactivate ISR Timer expires, the UE has to deactivate ISR locally, that is, sets a TIN to a "P-TMSI". The UE stops the E-UTRAN Deactivate ISR Timer upon entering an EPS Mobility Management-DEREGISTERED (EMM-DEREGISTERED) state or an EPS Mobility Management-CONNECTED (EMM-CONNECTED) mode. If the periodic RAU timer expires when the UE resides in the E-UTRAN, the UE has to start a GERAN/UTRAN Deactivate ISR Timer (GERAN stands for GSM EDGE Radio Access Network. GSM stands for Global System for Mobile communication, and EDGE stands for Enhanced Data rates for GSM Evolution), and the UE has to initiate an RAU procedure immediately upon next entry into the UTRAN. The UE has to deactivate ISR when the GERAN/UTRAN Deactivate ISR Timer expires. The UE stops the GERAN/UTRAN Deactivate ISR Timer upon entering a GPRS Mobility Management-DEREGISTERED (GMM-DEREGISTERED) state or a GMM-CONNECTED mode.

As stipulated in the existing specification, the mobile reachable timer has a slightly larger timer length (that is, a timing period as meant hereinafter; and a timer length, a timing period, and a timer value refer to the same meaning) than that of the periodic TAU timer or the periodic RAU timer. When ISR is activated, the Implicit Detach Timer at the MME has a larger timer value than that of the E-UTRAN Deactivate ISR Timer of the UE, and the Implicit Detach Timer at the SGSN has a larger timer value than that of the GERAN/UTRAN Deactivate ISR Timer of the UE.

The UE initiating the RAU has to include a different identity in an RAU request dependent upon setting of a TIN. The RAU request includes only a Packet Temporary Mobile Station Identity (P-TMSI) when ISR is activated. When ISR is deactivated, the RAU request includes only a P-TMSI if the TIN is set to the P-TMSI. If the TIN is set to a Globally Unique Temporary Identity (GUTI), the UE has to map the GUTI to a P-TMSI and include it in an RAU request message and shall also include the P-TMSI in the RAU request message if the UE is also provided with the P-TMSI, The SGSN can further search locally with the P-TMSI for a context of the UE upon reception of the request including the two temporary identities.

Thus the MME instructs the UE to activate ISR if the old SGSN still instructs the MME to activate ISR in the step S105 upon reception of a context request message from the MME (the step S104) after the Mobile Reachable Timer of the UE expires and before the Implicit Detach Timer expires. At this time, since the UE firstly is attached over the UTRAN and its TIN is set to a P-TMSI, the UE will set the TIN to an RAT-related TMSI when the TAU Accept message instructs ISR to be activated, if at this time the LIE goes from the E-UTRAN back to the UTRAN again and the UE determines that ISR is in an activated state, that is, the TIN is set to the RAT-related TMSI, the UE will initiate the RAU with the P-TMSI. At this time the Implicit Detach Timer maintained by the SGSN may have expired, and since the SGSN initiates the implicit detach procedure after the Implicit Detach Timer expires, the context of the UE is absent at the SGSN at that time, so the SGSN can not retrieve the context of the UE with the P-TMSI over the network. At this time the network will reject the RAU request of the UE, and the UE, has to reinitiate an attach procedure. The network can also reinitiate an authentication procedure. Inconsistency arises between the ISR state indication at the UE side and the ISR state at the network side (that is, a context maintenance condition of the UE at the network side), thus resulting in a certain delay in an access of the UE over the UTRAN.

Furthermore, the SGSN has to maintain the context of the UE upon reception of the Context Acknowledgement message from the MME as mentioned in the step S107. However, a specific period of time for which the context of the UE is maintained is absent in the specification. If the SGSN receives a Context Request message from the MME after the Mobile Reachable Timer of the UE expires and before the Implicit Detach Timer expires, instructs the MME to activate ISR and continues with maintaining the context of the UE after the Implicit Detach Timer expires, then a great deal of useless context information arises in the SGSN, and a mechanism to clean such useless information is absent.

The foregoing problem can be addressed in such a method that ISR is deactivated locally at the UE side. An underlying idea of this method is as follows:

1) In the UTRAN, the UE does not activate ISR or deactivates ISR locally if the periodic TAU timer of the UE expires when the network instructs the UE to activate ISR in the RAU. Thereafter the TAU request message will include two temporary identities of a P-TMSI and a GUTI when the UE accessing the E-UTRAN initiates the TAU 2) In the E-UTRAN, the UE does not activate ISR or deactivates ISR locally if the periodic RAU timer of the UE expires when the network instructs the UE to activate ISR in the TAU. Thereafter the RAU request message will include two temporary identities of a P-TMSI and a GUTI when the UE accessing the UTRAN initiates the RAU.

The problem of inconsistency between the context maintenance condition indicated by the ISR state at the UE side and the real maintenance condition may still arise in the foregoing method, and either the TAU request or the RAU request will include two identities due to deactivation of ISR when the UE accesses from one network to another network, thus wasting an air interface resource to some extent; and the two temporary identities have to be received at the network side for processing, thus increasing signalling overhead at the network side and time delay in the TAU or RAU process.

SUMMARY OF THE INVENTION

The invention provides a method and network-side device for optimizing activation/deactivation of ISR, an ISR operation method at the UE side and a UE so as to optimize the existing ISR activation flow and ISR activation method.

The invention provides a method for optimizing activation/deactivation of Idle State Signalling Reduction (ISR), which includes:

receiving, by a first network entity, a Context Request message transmitted from a second network entity and deciding to activate or deactivate ISR according to an operation state of a mobile reachable timer and/or an implicit detach timer corresponding to a UE in an area update procedure of the UE, wherein the first network entity belongs to a first network and the second network entity belongs to a second network; and transmitting, by the first network entity, a decision result to the second network entity, and the second network entity instructing the UE to activate or deactivate ISR in response to the received decision result.

The invention further provides an ISR operation method at the UE side, which includes:
  receiving, by a. LIE, an ISR activation instruction transmitted from the network side in an area update procedure of a second network; and
  starting or restarting, by the UE, a deactivate ISR timer of a first network of the UE upon determining that a periodic area update timer of the first network of the UE expires.

The invention further provides a first network-side device for optimizing activation/deactivation of ISR in a first network, which includes:
  a first activation deciding unit configured to decide to activate or deactivate ISR according to an operation state of a mobile reachable timer and/or an implicit detach timer corresponding to a UE upon reception of a Context Request message transmitted from a second network-side device in a second network in an area update procedure of the UE; and
  a transmitting unit configured to transmit a decision result to the second network-side device.

The invention further provides a User Equipment (UE), which includes:
  an instruction receiving unit configured to receive an ISR activation instruction transmitted from the network side in an area update procedure of a second network; and
  a deactivate ISR timer restarting unit configured to start or restart a deactivate ISR timer of a first network of the UE upon determining that a periodic area update timer of the first network of the UE expires upon reception of the ISR activation instruction.

The invention has the advantageous effects of optimizing the existing ISR activation and deactivation flows and ISR operation method at the UE side, of keeping highly consistent ISR processes at the network side and the UE side and of avoiding unnecessary signalling overhead.

DETAILED DESCRIPTION OF THE EMBODIMENTS

A method and network-side device for optimizing activation/deactivation of ISR, an ISR operation method at the UE side and a UE according to the invention will be described below in further details with reference to the drawings and embodiments.

Figure 1:
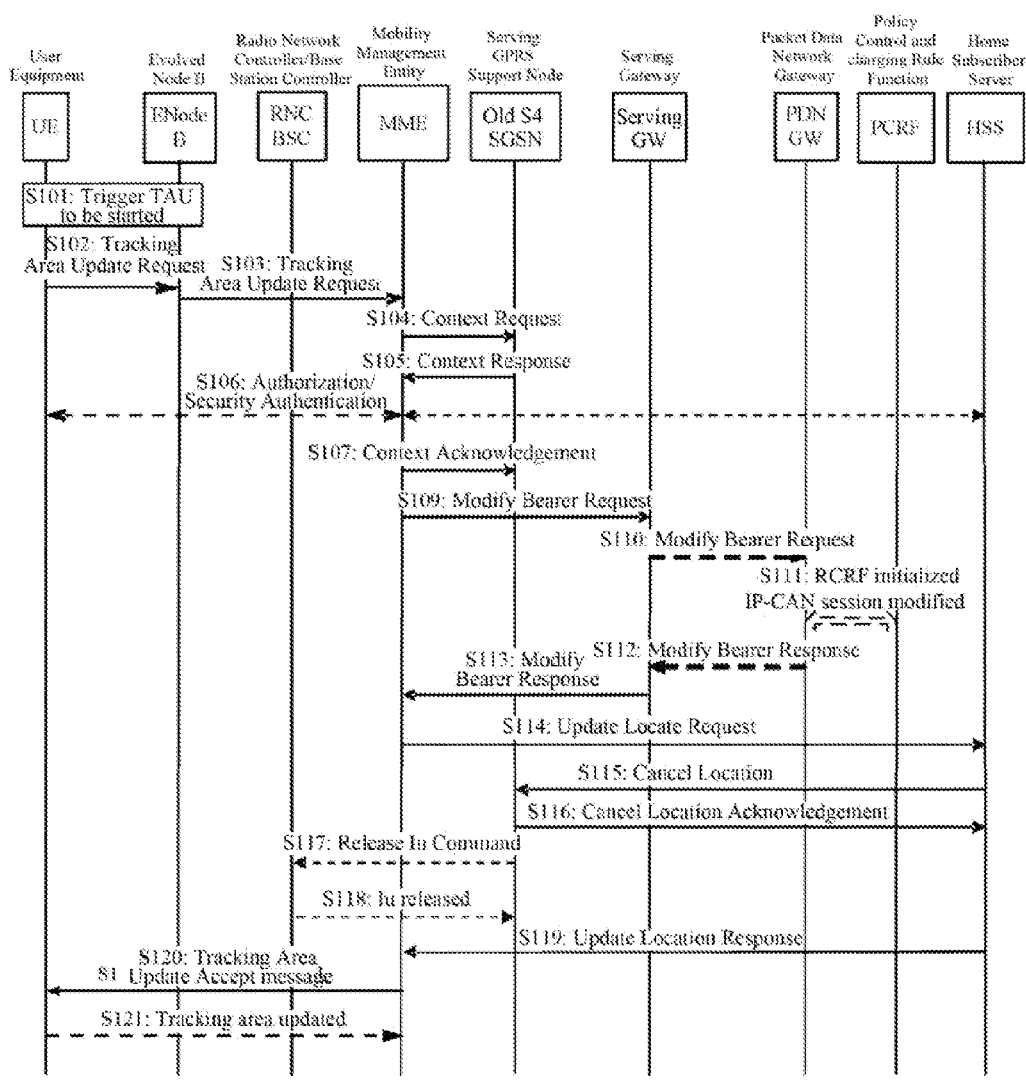
FIG. 1 is a flow chart of an area update procedure stipulated the existing specification.
Figure 2:
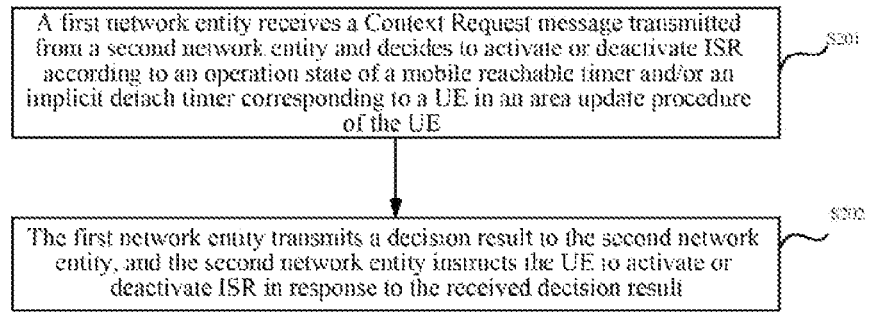
FIG. 2 is a flow chart of a method for optimizing activation/deactivation of ISR according to the invention.

In order to address the situation in the prior art of inconsistency between ISR states at the network side and the UE side during interaction between an MME and an SGSN about whether to activate ISR because activation of ISR is decided as long as it is determined that the present network node supports activation of ISR, the invention proposes a method for optimizing activation/deactivation of ISR, as illustrated in FIG. 2, which includes the following steps.

In the step S201, a first network entity decides to activate or deactivate ISR according to an operation state of a mobile reachable timer, or an implicit detach timer, or a mobile reachable timer and an implicit detach timer corresponding to a UE upon reception of a Context Request message transmitted from a second network entity in an area update procedure of the UE.

Preferably, the area update procedure is a TAU procedure initiated by the UE accessing a TA in an E-UTRAN from an RA in a UTRAN, and the first network entity is an SGSN and the second network entity is an MME;

Or the area update procedure is an RAU procedure initiated by the LIE accessing an RA in a UTRAN from a TA in an E-UTRAN, and the first network entity is an MME and the second network entity is an SGSN.

In the step S202, the first network entity transmits a decision result to the second network entity. The second network entity instructs the UE to activate or deactivate ISR in response to the received decision result. Preferably, the second network entity transmits the ISR activation or deactivation instruction to the first network entity in a Context Acknowledgement message.

Particularly, the first network entity transmits the decision result to the second network entity in a Context Response message, for example.

Preferably, when the area update procedure is the TAU procedure initiated by the UE accessing the TA in the E-UTRAN from the RA in the UTRAN, the SGSN transmits the decision result to the MME; or When the area update procedure is the RAU procedure initiated by the UE accessing the RA in the UTRAN from the TA in the E-UTRAN, the MME transmits the decision result to the SGSN.

Particularly, the mobile reachable timer is maintained by the first network entity, started when the UE enters an idle state and stopped when the UE enters a connected state, that is, has an NAS signalling connection established with the first network entity, and its expiration results in the start of the implicit detach timer; and the implicit detach timer is maintained by the first network entity and stopped when the UE enters a connected state or the UE has an NAS signalling connection established with the first network entity, and its expiration triggers the first network entity to perform a detach procedure of the UE, and the detach procedure deletes a context of the UE maintained in the first network entity.

In the invention, the first network entity decides whether to activate ISR according to the operation states of its maintained mobile reachable timer and implicit detach timer of the UE upon reception of the context request instead of instructing ISR to be activated if the network node supports activation of ISR as in the existing flow. Those skilled in the art can appreciate that such a problem may arise that a context may be absent if the UE gets back when ISR is activated because expiration of the mobile reachable timer may trigger the detach timer, and this problem can be avoided when it is decided whether to activate ISR according to the operation state of the mobile reachable timer, or the implicit detach timer, or the mobile reachable timer and the implicit detach timer.

Preferred embodiments of the invention will be given below.

Figure 3:
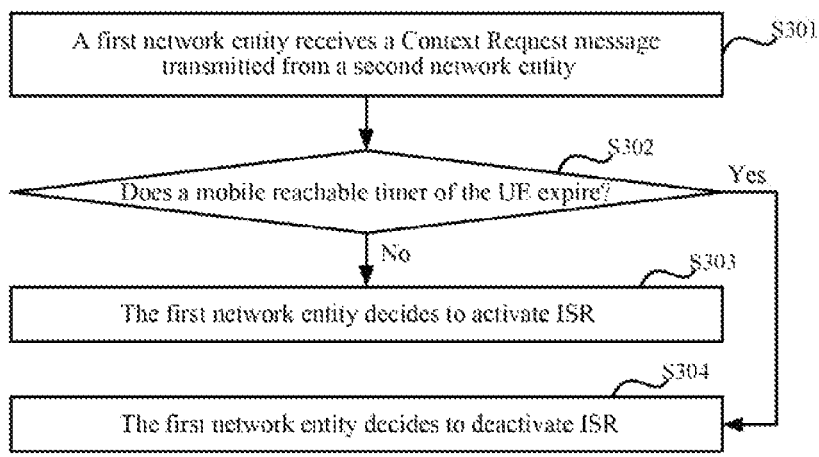
FIG. 3 is a flow chart of a method for optimizing activation/deactivation ISR according to an embodiment of the invention.

As illustrated in FIG. 3, a method for optimizing activation/deactivation of ISR according to a first embodiment of the invention includes the following steps.

Step S301. A first network entity receives a Context Request message transmitted from a second network entity in an area update procedure of a UE.

Step S302. The first network entity determines whether its maintained mobile reachable timer of the UE expires, and if not, it performs the step S303; and if so, it performs the step S304.

Step S303. The first network entity decides to activate ISR.

Since the mobile reachable timer does not expire, then an implicit detach timer corresponding to the UE has not been started, and the started implicit detach timer has a larger timer length than that of a deactivate ISR timer of a first network of the UE if ISR is activated as per the existing specification, so when the UE gets back to the network where the first network entity resides in an ISR activated state, a context of the UE is still stored on the first network entity, and the problem in the prior art of failing to retrieve the context of the UE will not arise.

Step S304. The first network entity decides to deactivate ISR.

Alternatively, in the step S302 of this embodiment, it can be determined whether the implicit detach timer corresponding to the UE is running, and if not, the flow goes to the step S303; and if so, the flow goes to the step S304.

Alternatively, it can be determined both whether the implicit detach timer is running and whether the mobile reachable timer expires, and it is decided whether to activate or deactivate ISR according to determination results.

The mobile reachable timer expires and this indicates that the implicit detach timer is started, which means that the context of the UE will be deleted after a period of time, so it is decided to deactivate ISR. Thus the UE deactivates ISR upon reception of an ISR deactivation instruction, and when the UE gets back to the network where the first network entity resides, ISR is not activated at either the network side or the UE side, so such a situation will not arise that the context of the UE can not be retrieved with an identity provided by the UE at the network side over the network.

It shall be noted here that deactivation of ISR as referred to in the invention relates to two situations: the UE keeps ISR not activated when ISR is not activated in one situation and the UE deactivates ISR when ISR has been activated in the other situation.

A specific flow of the embodiment of the invention will be given below in specific application scenarios.

In a first application scenario, the UE initiates an RAU upon accessing an RA in a UTRAN from a TA in an E-UTRAN, that is, the UE chooses to reside in the UTRAN.

Figure 4:
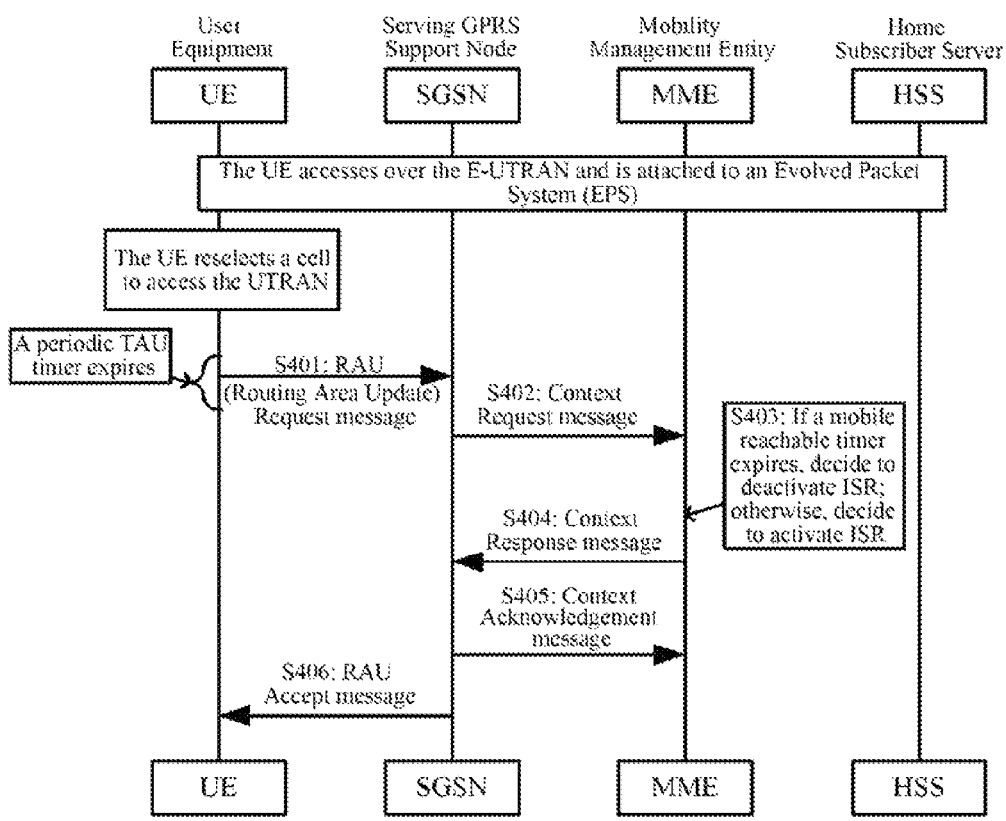
FIG. 4 is a flow chart of a method for optimizing activation/deactivation of ISR in an application scenario according to an embodiment of the invention.

As illustrated in FIG. 4, a flow of activation/deactivation by the UE in this embodiment is as follows when the UE accesses over the E-UTRAN and is attached to an EPS and the UE reselects a cell to access the UTRAN.

Step S401. The UE transmits an RAU Request message to the SGSN, and a periodic TAU timer of the UE expires before or after the message is transmitted.

Step S402. The SGSN receives the RAU Request message transmitted from the UE and transmits a Context Request message to the MME.

Step S403. The MIME receives the Context Request message transmitted from the SGSN and determines whether its maintained mobile reachable timer of the UE expires.

The MME decides to activate ISR if the mobile reachable timer corresponding to the UE does not expire.

If the mobile reachable timer corresponding to the UE expires, the implicit detach tinier shall not have expired as per the existing timer length definition and flow, and the MME determines that the implicit detach timer is running and then decides to deactivate ISR.

Step S404. The SGSN receives the result of deciding to activate/deactivate ISR transmitted from the MME in a Context Response message and decides to instruct ISR to be activated or deactivated according to whether c network node supports activation of ISR as well.

Step S405. The SGSN transmits an ISR activation/deactivation instruction to the MME in a Context Acknowledgement message.

Step S406. The SGSN transmits the ISR activation/deactivation instruction to the UE in an RAU Accept message, and accordingly the UE proceeds as in the existing ISR activation/deactivation flow.

Since it is decided to deactivate ISR when the mobile reachable timer expires or the implicit detach timer is running, there is an ISR deactivated state at the UE side. Thus the UE getting back to the E-UTRAN will initiate a TAU with only one temporary identity. There is an ISR deactivated state consistently both at the network side and at the UE side. The situation can be avoided that the UE provides the network with a temporary identity as if ISR is activated but the network can not locate a context of the UE with the temporary identity.

In a second application scenario, the UE initiates a TAU upon accessing a TA in an E-UTRAN from an RA in a UTRAN, that is, the UE chooses to reside in the E-UTRAN, A flow of activation/deactivation by the UE in this embodiment is as follows when the UE accesses over the UTRAN and is attached to an EPS and the UE reselects a cell to access E-UTRAN.

The UE transmits a TAU Request message to the MME.

The MME receives the TAU Request message transmitted from the UE and transmits a Context Request message to the SGSN.

The SGSN receives the Context Request message transmitted from the MME and determines whether its maintained mobile reachable timer of the UE expires.

The SGSN decides to activate ISR if the mobile reachable timer corresponding to the UE does not expire.

If the mobile reachable timer corresponding to the UE expires, the implicit detach timer shall not have expired as per the existing timer length definition and flow, and the SGSN determines that the implicit detach timer is running and then decides to deactivate ISR.

The MME receives the result of deciding to activate/deactivate ISR transmitted from the SGSN in a Context Response message and decides to instruct ISR to be activated or deactivated according to whether the network node supports activation of ISR as well.

The MME transmits an ISR activation/deactivation instruction to the SGSN in a Context Acknowledgement message.

The MME transmits the ISR activation/deactivation instruction to the UE in an TAU Accept message, and accordingly the UE proceeds as in the existing ISR activation/deactivation flow.

Figure 5:
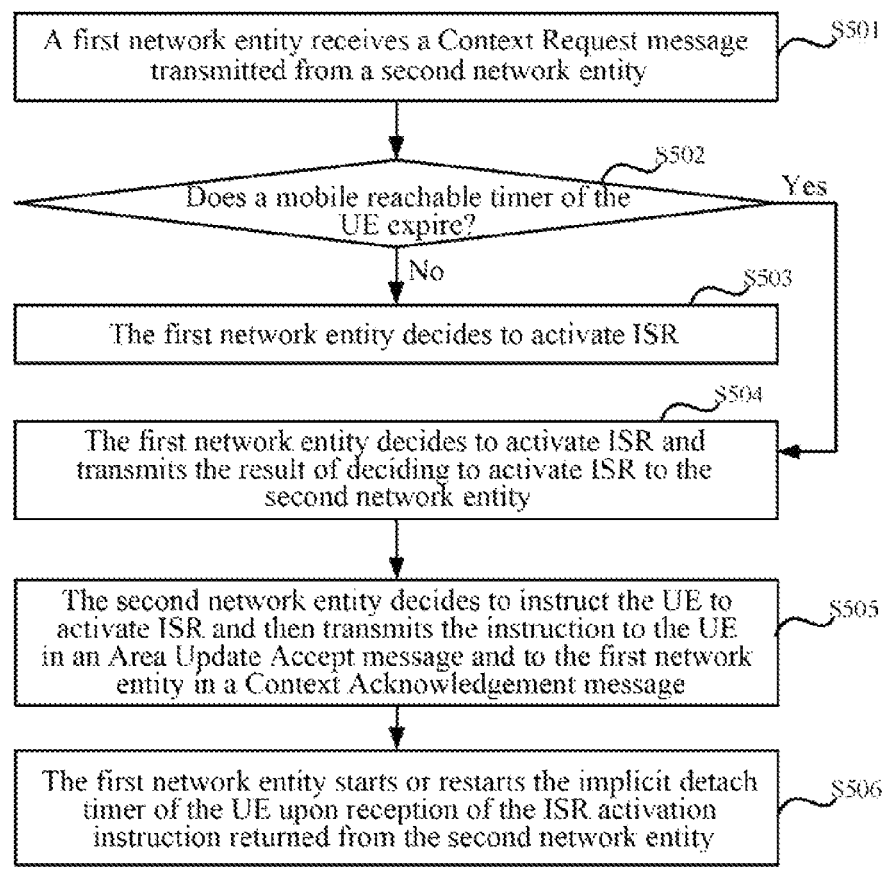
FIG. 5 is a flow chart of another method for optimizing activation/deactivation of ISR according to an embodiment of the invention.

As illustrated in FIG. 5, another method for optimizing activation/deactivation of ISR according to an embodiment of the invention includes the following steps.

Step S501. A first network entity receives a Context Request message transmitted from a second network entity in an area update procedure of a UE.

Step S502. The first network entity determines whether a mobile reachable timer corresponding to the UE expires, and if not, it performs the step S503; and if so, it performs the step S504.

Step S503. The first network entity decides to activate ISR.

Since the mobile reachable timer does not expire, then an implicit detach timer has not been started, and the implicit detach timer has a larger timer length than that of a deactivate ISR timer of a first network of the UE as per the existing specification, so when the UE gets back to the network where the first network entity resides in an ISR activated state, a context of the UE is still stored on the first network entity, and the problem in the prior art of failing to retrieve the context of the UE will not arise.

Step S504. The first network entity decides to activate ISR and transmits the result of deciding to activate ISR to the second network entity.

Step S505, The second network entity receives the result of ISR activation, and then if it is determined that the network node supports activation of ISR, it decides to instruct the UE to activate ISR and transmits an ISR activation instruction to UE in an Area Update Accept message and to the first network entity in a Context Acknowledgement message.

Particularly, the UE starts or stops and then starts the deactivate ISR timer of the first network of the UE if a periodic area update timer of the first network of the UE expires when the UE receives the ISR activation instruction transmitted from the second network.

"Stop and then start" as mentioned in the embodiment of the invention refers to "restart", and thus "restart" will refer to "stop and then start" throughout the following embodiments.

Step S506. The first network entity receives the ISR activation instruction returned from the second network entity, and then if the implicit detach timer corresponding to the UE is running, it restarts the implicit detach timer corresponding to the UE with a slightly larger timer length than that of the deactivate ISR timer of the first network of the UE.

Alternatively, in the step S502, it can be decided whether to activate ISR according to whether the implicit detach timer is running.

An area update timer of the first network is maintained by the UE, started when the UE goes into the idle state and stopped when the UE enters a connected state, that is, has an NAS signalling connection established with the first network, and its expiration triggers the UE to initiate an area update.

The deactivate ISR timer of the first network is maintained by the UE, started when the area update timer of the first network expires and ISR is in an activated state and stopped when the UE enters a connected state, that is, has an NAS signalling connection established with the first network, and its expiration triggers the UE to deactivate ISR.

Preferably, the first network entity is a Mobility Management Entity (MME), the second network entity is a Serving GPRS Support Node (SGSN), the deactivate ISR timer of the first network of the UE is an E-UTRAN deactivate ISR timer, and the periodic area update timer of the first network is a periodic tracking area update timer; or The first network entity is an SGSN, the second network entity is an MME, the deactivate ISR timer of the first network of the UE is a GERAN/UTRAN deactivate ISR timer, and the periodic area update tinier of the first network is a periodic routing area update timer.

That is, the first network corresponds to the first network entity, and the second network corresponds to the second network entity.

When it is decided to instruct the UE to activate ISR, the UE and the first network entity start respectively the deactivate ISR timer of the first network and the implicit detach timer at the same time, and when the ISR is activated, the implicit detach timer has a larger timing period than that of the deactivate ISR timer of the first network as per the existing specification, so the first network entity has not delete the context of the UE if the deactivate ISR timer of the first network of the UE does not expire when the UE gets back to the network where the first network entity resides. If the deactivate ISR timer of the first network of the UE expires, the UE has deactivated ISR, and no problem will arise even if ISR is not deactivated at the network side.

Figure 6:
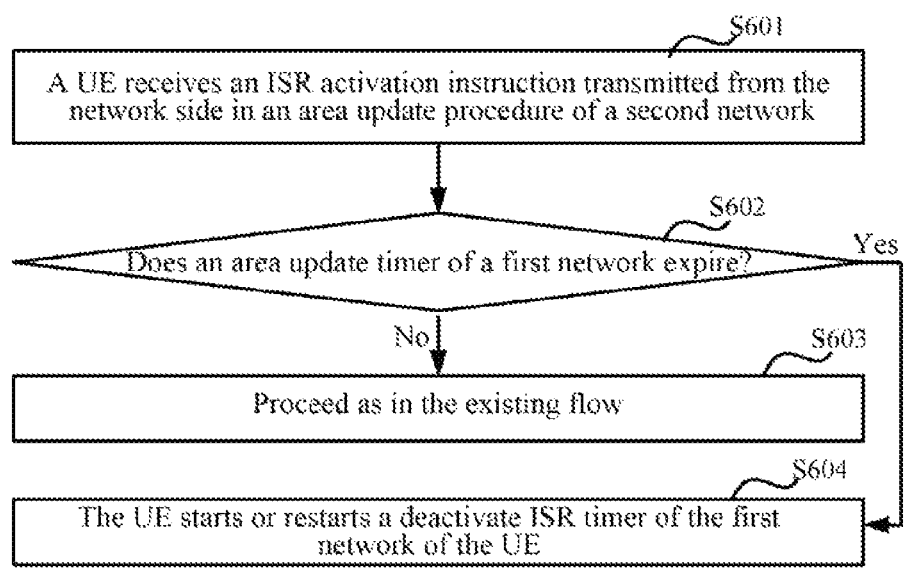
FIG. 6 is flow chart of an ISR operation method at the UE side according to an embodiment of the invention.

An embodiment of the invention further provides an ISR operation method ado UE side, as illustrated in FIG. 6, which includes the following steps.

Step S601. A UE receives an ISR activation instruction transmitted from the network side in an area update procedure of a second network.

Step S602. The UE determines whether an area update timer of a first network expires, and if not, it performs the step S603; and if so, it performs the step S604.

Step S603. The UE proceeds as in the existing flow, that is, activates ISR upon reception of an Area Update Accept message including ISR activation instruction information. After the area update procedure is finished, thus entering an idle state, a periodic area update timer of the second network is started, and when the area update timer expires in an idle state, a deactivate ISR timer of the second network is started.

Step S604, The UE starts or restarts a deactivate ISR timer of the first network of the UE.

Preferably, the area update procedure of the second network is a routing area update procedure, the periodic area update timer of the first network is a periodic tracking area update timer, and the deactivate ISR timer of the first network is an E-UTRAN deactivate. ISR timer; or The area update procedure of the second network is a tracking area update procedure, the periodic area update timer of the first network is a periodic routing area update timer, and the deactivate ISR timer of the first network is a GERAN/UTRAN deactivate ISR timer.

A specific flow of the embodiment of the invention will be given below in specific application scenarios.

In a first application scenario, the UE initiates an RAU upon accessing an RA in a UTRAN from a TA in an E-UTRAN, that is, the UE chooses to reside in the UTRAN.

Figure 7:
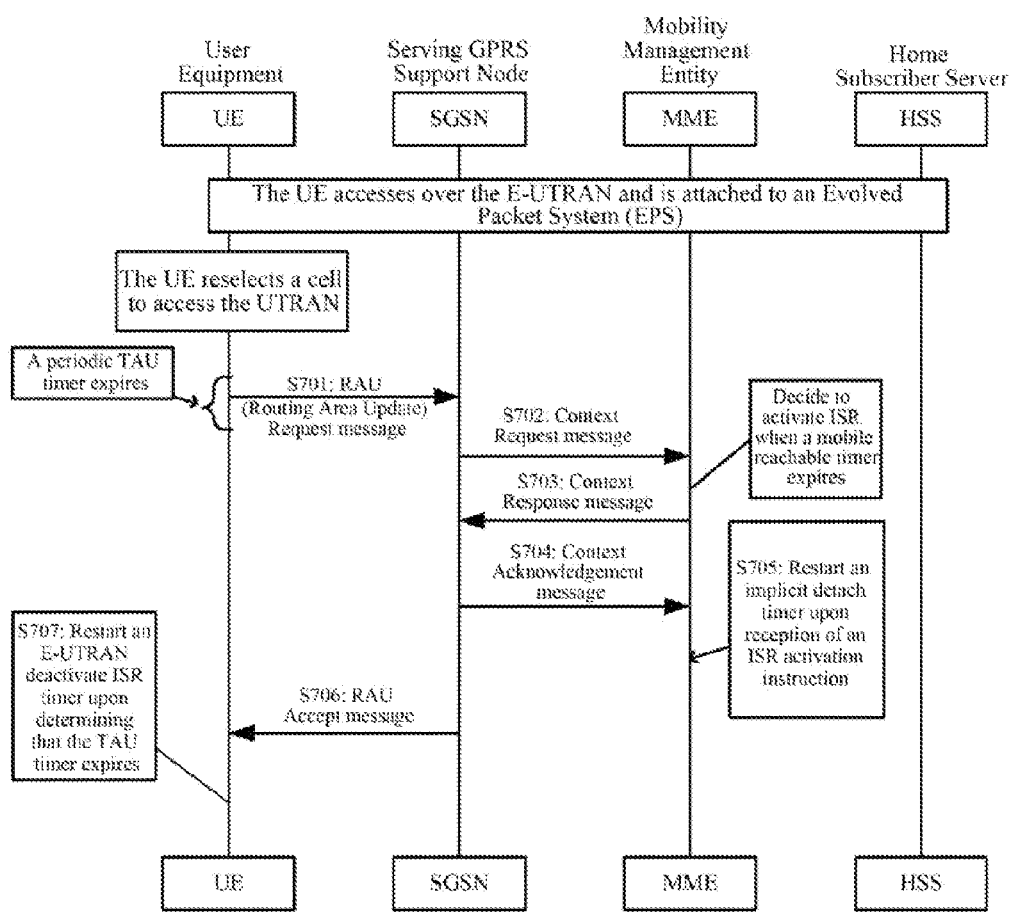
FIG. 7 is a flow chart of another method for optimizing activation/deactivation of ISR in an application scenario according to an embodiment of the invention.

As illustrated in FIG. 7, a flow of activation/deactivation by the UE in this embodiment is as follows when the UE accesses over the E-UTRAN and is attached to an EPS and the UE reselects a cell to access the UTRAN.

Step S701, The UE transmits an RAU Request message to the SGSN, a periodic area update timer, TAU timer, of the UE expires at a certain instance of time before or after the message is transmitted, and the UE has not received an RAU Accept message at that instance of time.

Step S702. The SGSN receives the RAU Request message transmitted from the UE and transmits a Context Request message to the MME.

The MME receives the Context Request message transmitted from the SGSN and determines whether its maintained mobile reachable timer of the UE expires and whether an implicit detach timer is running.

The MME decides to activate ISR if the mobile reachable timer corresponding to the UE does not expire, and the flow proceeds as in the existing flow, so a detailed description thereof will be omitted here.

If the mobile reachable timer corresponding to the UE expires and the implicit detach timer is running, it is decided to activate ISR, and the following flow will be described in this scenario.

Step S703. The SGSN receives the result of deciding to activate ISR transmitted from the MME in a Context Response message, and the SGSN performs the step S704 upon deciding to instruct the UE to activate ISR according to whether the SGSN supports activation of ISR as well.

Step S704. The SGSN transmits an ISR activation instruction to the MME in a Context Acknowledgement message.

Step 705. The MIME receives the ISR activation instruction in the Context Acknowledgement message, and then if the implicit detach timer corresponding to the UE is running, it restarts the implicit detach timer corresponding to the UE at a slightly larger timing period than that of an E-UTRAN deactivate ISR timer of the UE.

Step S706. The SGSN transmits the ISR activation instruction to the UE in an RAU Accept message.

Step 707. The UE receives the RAU Accept message including the ISR activation instruction and then determines whether the periodic tracking area update timer of the UE expires, and if so, it starts or restarts the E-UTRAN deactivate ISR timer of the UE.

In a second application scenario, the UE initiates a TAU upon accessing a TA in an E-UTRAN from an RA in a UTRAN, that is, the UE chooses to reside in the E-UTRAN.

A flow of activation/deactivation by the UE in this embodiment is as follows When the UE accesses over the UTRAN and is attached to an EPS and the UE reselects a cell to access the E-UTRAN.

The UE transmits a TAU Request message to the MME, a periodic area update timer, RAU timer, of the UE expires before or after the message is transmitted, and the UE has not received a TAU Accept message at the time of expiration.

The MME receives the TAU Request message transmitted from the UE and transmits a Context Request message to the SGSN.

The SGSN receives the Context Request message transmitted from the MME and determines Whether its maintained mobile reachable timer of the UE expires and whether an implicit detach timer is running.

The SGSN decides to activate ISR if the mobile reachable timer corresponding to the UE does not expire, and the flow proceeds as in the existing flow, so a detailed description thereof will be omitted here.

If the mobile reachable timer corresponding to the UE expires and the implicit detach timer is running it is decided to activate ISR, and the following flow will be described in this scenario.

The MME receives the result of deciding to activate ISR transmitted from the SGSN in a Context Response message, and the MME transmits an ISR activation instruction to the SGSN in a Context Acknowledgement message upon deciding to instruct the UE to activate ISR according to whether the MME supports activation of ISR as well.

The SGSN receives the ISR activation instruction in the Context Acknowledgement message, and then if the implicit detach timer corresponding to the UE is running, it restarts the implicit detach tinier corresponding to the UE at a slightly larger timing period than that of a GERNA/UTRAN deactivate ISR timer of the UE.

The MME transmits the ISR activation instruction to the UE in a TAU Accept Message.

The UE receives the TAU Accept message including the ISR activation instruction and Then determines whether the periodic routing area update timer of the UE expires, and if so, it starts or restarts the GERNA/UTRAN deactivate ISR timer of the UE.

Figure 8:
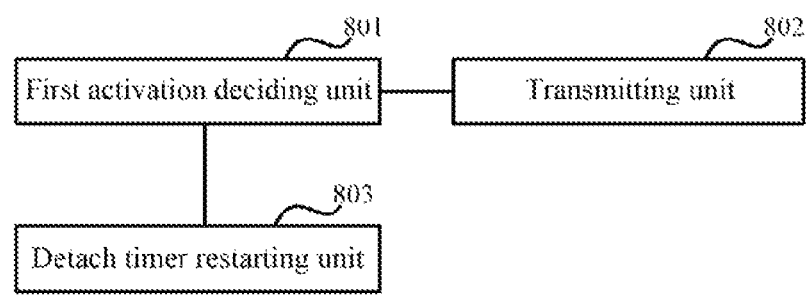
FIG. 8 is a structural block diagram of a first network-side device for optimizing activation/deactivation of ISR according to an embodiment of the invention.

There is provided in a third embodiment of the invention a first network-side device for optimizing activation/deactivation of ISR, as illustrated in FIG. 8, which includes:

a first activation deciding unit 801 configured to decide to activate or deactivate ISR according to an operation state of a mobile reachable timer and/or an implicit detach timer corresponding to a UE upon reception of a Context Request message transmitted from a second network-side device in an area update of the UE; and a transmitting unit 802 configured to transmit a decision result to the second network-side device.

Preferably, the first activation deciding unit 801 is further configured to decide to deactivate ISR when the mobile reachable timer corresponding to the UE expires or decide to deactivate ISR when the implicit detach timer corresponding to the UE is running; or The first activation deciding unit 801 is further configured to decide to activate; ISR after the mobile reachable timer corresponding to the UE expires and when the implicit detach timer corresponding to the UE is running; and the first network-side device further includes: a detach timer restarting unit 803 configured to restart the implicit detach timer corresponding to the UE upon determining that the implicit detach timer corresponding to the UE is running when an ISR activation/deactivation instruction returned from the second network-side device is determined as an ISR activation instruction.

And the first activation deciding unit 801 is further configured to decide to activate ISR when the mobile reachable timer corresponding to the UE does not expire.

In this embodiment, the restarted implicit detach timer has a larger timing period than that of a deactivate ISR timer of a first network of the UE.

The first network-side device is a Mobility Management Entity (MME), the second network-side device is a Serving GPRS Support Node (SGSN), and the deactivate ISR timer of the first network of the UE is an E-UTRAN deactivate ISR timer; or The first network-side device is an SGSN, the second network-side device is an MME, and the deactivate ISR timer of the first network of the UE is a GERAN/UTRAN deactivate ISR timer.

Figure 9:
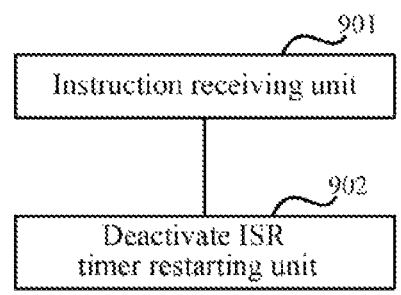
FIG. 9 is a structural diagram of a User Equipment (UE) according to an embodiment of the invention.

There is further provided in an embodiment of the invention a User Equipment (UE), as illustrated in FIG. 9, which includes:

an instruction receiving unit 901 configured to receive an ISR activation instruction transmitted from the network side in an area update procedure of a second network; and a deactivate ISR timer restarting unit 902 configured to start or restart a deactivate ISR timer of a first network of the UE upon determining that a periodic area update timer of the first network of the UE expires upon reception of the ISR activation instruction.

Preferably, the area update procedure of the second network is a routing area update procedure, the periodic area update tinier of the first network is a periodic tracking area update timer, and the deactivate ISR timer of the first network is an E-UTRAN deactivate ISR timer; or The area update procedure of the second network is a tracking area update procedure, periodic area update timer of the first network is a periodic routing area update timer, and the deactivate ISR timer of the first network is a GERAN/UTRAN deactivate ISR timer.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory an optical memory, etc.) in which computer useable program codes are contained.

The invention has been described in a flow chart and/or a block diagram of the method, device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions, These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Evidently those skilled in the art can make various modifications and variations to the invention bout departing from the scope of the invention. Thus the invention is also intended to encompass these modifications and variations thereto so long as the modifications and variations come into the scope of the claims appended to the invention and their equivalents.

The invention claimed is:

1. A method for optimizing activation/deactivation of Idle State Signalling Reduction, ISR, comprising:
receiving, by a first network entity, a Context Request message transmitted from a second network entity and deciding to activate or deactivate ISR according to an operation state of a mobile reachable timer, or an implicit detach timer, or a mobile reachable timer and an implicit detach timer corresponding to a UE in an area update procedure of the UE, wherein the first network entity belongs to a first network and the second network entity belongs to a second network; and
transmitting, by the first network entity, a decision result to the second network entity, and the second network entity instructing the UE to activate or deactivate ISR in response to the received decision result.

2. The method according to claim 1, wherein the first network entity deciding to activate or deactivate ISR according to an operation state of a mobile reachable timer, or an implicit detach timer, or a mobile reachable timer and an implicit detach timer corresponding to a UE further comprises:
deciding to deactivate ISR when the mobile reachable timer corresponding to the UE expires; or
deciding to deactivate ISR when the implicit detach timer corresponding to the UE is running; or
deciding to deactivate ISR when the mobile reachable timer corresponding to the UE expires and the implicit detach timer corresponding to the UE is running.

3. The method according to claim 1, wherein the first network entity deciding to activate or deactivate ISR according to an operation state of a mobile reachable timer, or an implicit detach timer, or a mobile reachable timer and an implicit detach timer corresponding to a UE further comprises:
deciding to activate ISR when the mobile reachable timer corresponding to the UE expires and the implicit detach timer corresponding to the UE is running.

4. The method according to claim 1, further comprising:
restarting, by the first network entity, the implicit detach timer corresponding to the UE when an ISR activation or deactivation instruction returned from the second network entity is determined as an ISR activation instruction.

5. The method according to claim 4, wherein the restarted implicit detach timer corresponding to the UE has a larger timer length than that of a deactivate ISR timer of the first network of the UE.

6. The method according to claim 1, further comprising:
restarting, by the UE, a deactivate ISR timer of the first network of the UE if a periodic area update timer of the first network of the UE expires upon reception of an ISR activation instruction transmitted from the second network entity.

7. The method according to claim 1, wherein the area update procedure is a routing area update procedure, the first network entity is a Mobility Management Entity, MME, and the second network entity is a Serving GPRS Support Node, SGSN; or
the area update procedure is a tracking area update procedure, the first network entity is an SGSN, and the second network entity is an MME.

8. The method according to claim 7, wherein a deactivate ISR timer of the first network of the UE is an E-UTRAN deactivate ISR timer, and a periodic area update timer of the first network of the UE is a periodic tracking area update timer when the area update procedure is a routing area update procedure; or
a deactivate ISR timer of the first network of the UE is a GERAN/UTRAN deactivate ISR timer, and a periodic area update timer of the first network of the UE is a periodic routing area update timer when the area update procedure is a tracking area update procedure.

9. The method according to claim 1, wherein the first network entity deciding to activate or deactivate ISR according to an operation state of a mobile reachable timer, or an implicit detach timer, or a mobile reachable timer and an implicit detach timer corresponding to a UE further comprises:

deciding to activate ISR when the mobile reachable timer corresponding to the UE does not expire.

10. A first network-side device for optimizing activation/deactivation of ISR in a first network, comprising:

a first activation deciding unit configured to decide to activate or deactivate ISR according to an operation state of a mobile reachable timer, or an implicit detach timer, or a mobile reachable timer and an implicit detach timer corresponding to a UE upon reception of a Context Request message transmitted from a second network-side device in a second network in an area update procedure of the UE; and a transmitting unit configured to transmit a decision result to the second network-side device.

11. The device according to claim 10, wherein the first activation deciding unit is further configured to decide to deactivate ISR when the mobile reachable timer corresponding to the UE expires or decide to deactivate ISR when the implicit detach timer corresponding to the UE is running.

12. The device according to claim 10, wherein the first activation deciding unit is further configured to decide to activate ISR after the mobile reachable timer corresponding to the UE expires and when the implicit detach timer corresponding to the UE is running; or wherein the first activation deciding unit is further configured to decide to activate ISR when the mobile reachable timer corresponding to the UE does not expire.

13. The device according to claim 10, wherein the first network-side device further comprises:

a detach timer restarting unit configured to restart the implicit detach timer corresponding to the UE upon determining that an ISR activation/deactivation instruction returned from the second network-side device is determined as an ISR activation instruction.

14. The device according to claim 13, wherein the restarted implicit detach timer corresponding to the UE has a larger timer length than that of a deactivate ISR timer of the first network of the UE.

15. The device according to claim 10, wherein the area update procedure is a routing area update procedure, the first network-side device is a Mobility Management Entity, MME, and the second network-side device is a Serving GPRS Support Node, SGSN; or the area update procedure is a tracking area update procedure, the first network-side device is an SGSN, and the second network-side device is an MME.

16. The device according to claim 15, wherein:

a deactivate ISR timer of the first network of the UE is an E-UTRAN deactivate ISR timer when the area update procedure is a routing area update procedure; or a deactivate ISR timer of the first network of the UE is a GERAN/UTRAN deactivate ISR timer when the area update procedure is a tracking area update procedure.

* * * * *